United States Patent [19]

Pfaender

[11] E Re. 31,442

[45] Reissued Nov. 15, 1983

[54] METHOD AND APPARATUS FOR MANUFACTURE OF GLASS FILM

[75] Inventor: Lawrence V. Pfaender, Toledo, Ohio

[73] Assignee: Owens-Illinois, Inc., Toledo, Ohio

[21] Appl. No.: 302,332

[22] Filed: Sep. 15, 1981

Related U.S. Patent Documents

Reissue of:

[64] Patent No.: 4,268,296
Issued: May 19, 1981
Appl. No.: 99,457
Filed: Dec. 3, 1979

[51] Int. Cl.[3] ..... C03B 5/02; C03B 17/06

[52] U.S. Cl. ..... 65/90; 65/203; 65/327; 65/DIG. 4; 65/DIG. 5; 373/27

[58] Field of Search ..... 65/90, 203, DIG. 4, 65/DIG. 5, 327

[56] References Cited

U.S. PATENT DOCUMENTS

| | | | |
|---|---|---|---|
| 1,853,842 | 4/1932 | Bates et al. | 65/DIG. 4 |
| 2,111,860 | 3/1938 | Kilian | 65/203 X |
| 3,078,695 | 2/1963 | Kozak et al. | 65/327 X |
| 3,186,813 | 6/1965 | Pfaender | 65/90 |
| 3,682,609 | 8/1972 | Dockerty | 65/203 X |

FOREIGN PATENT DOCUMENTS

| | | | |
|---|---|---|---|
| 1144846 | 10/1957 | France | 65/327 |
| 245449 | 8/1926 | United Kingdom | 65/203 |

*Primary Examiner*—Arthur D. Kellogg
*Attorney, Agent, or Firm*—Charles S. Lynch; M. E. Click; D. H. Wilson, Jr.

[57] ABSTRACT

The invention provides a method and apparatus for the manufacture of glass film having a thickness not in excess of 0.003 inches and accomplished by drawing the film through a narrow slot-like orifice. The walls of the orifice are defined by an electrically conductive, hot glass resistant metal and electrical currents are introduced into the metal walls of the orifice to effectively maintain the central portions of the orifice walls at a higher temperature than each of the two lateral end walls of the orifice, thereby producing a temperature differential in the drawn film on the order of 40° F. between the edges of the film and the central portions of the film.

6 Claims, 2 Drawing Figures

METHOD AND APPARATUS FOR MANUFACTURE OF GLASS FILM

Matter enclosed in heavy brackets [ ] appears in the original patent but forms no part of this reissue specification; matter printed in italics indicates the additions made by reissue.

BACKGROUND OF THE INVENTION

The drawing of glass in sheet form from a molten pool is one of the oldest of the industrial arts. The desirability of maintaining the edges of the drawn sheet at a significant temperature differential below the temperature of the central portions of the sheet has long been known in the art and a variety of methods and apparatuses have been heretofore proposed for accomplishing such differential cooling of the drawn sheet. All of such prior art methods and apparatuses have, however, proven to be ineffective when an attempt is made to apply same to the drawing of glass film having a thickness not in excess of 0.003 inches and generally on the order of 0.0005 inches. For example, the prior art suggests cooling of the edges of the drawn sheet of glass by blowing cool air on the edges. Any blast of cooling air applied to a glass film of the thickness described would result in the complete destruction of the film. Other prior art patents have suggested placement of electrodes within the molten glass body at a position immediately adjacent the points at which the edges of the glass sheet are drawn from the molten glass. The drawn film is so narrow, viz. 12 to 24 inches, and the amount of glass withdrawn from a molten body in the fabrication of thin films is so small that no effective differential heating effect supposedly produced by the insertion of electrodes is achieved.

SUMMARY OF THE INVENTION

It is, accordingly, an object of this invention to provide an improved method and apparatus for drawing thin films of glass having a thickness not in excess of 0.003 inches.

A particular object of this invention is to effect the drawing of thin film glass through an orifice defined by two spaced walls of a glass resistant, electrically conductive metal and effecting the differential heating of such metal through the application of electrical currents thereto to effectively maintain the end portions of the orifice defining walls at a lower temperature than the central portions. Because the volume of molten glass passing through the orifice is so small, this differential temperature in the orifice walls is immediately translated into a differential temperature in the drawn glass film and hence the desired differential of approximately 40° F. between the temperature of the central portions of the drawn glass film and the edge portions can be maintained.

Other objects and advantages of the invention will be apparent to those skilled in the art from the following detailed description, taken in conjunction with the annexed sheets of drawings on which is shown a preferred embodiment of the invention.

Figure 1:
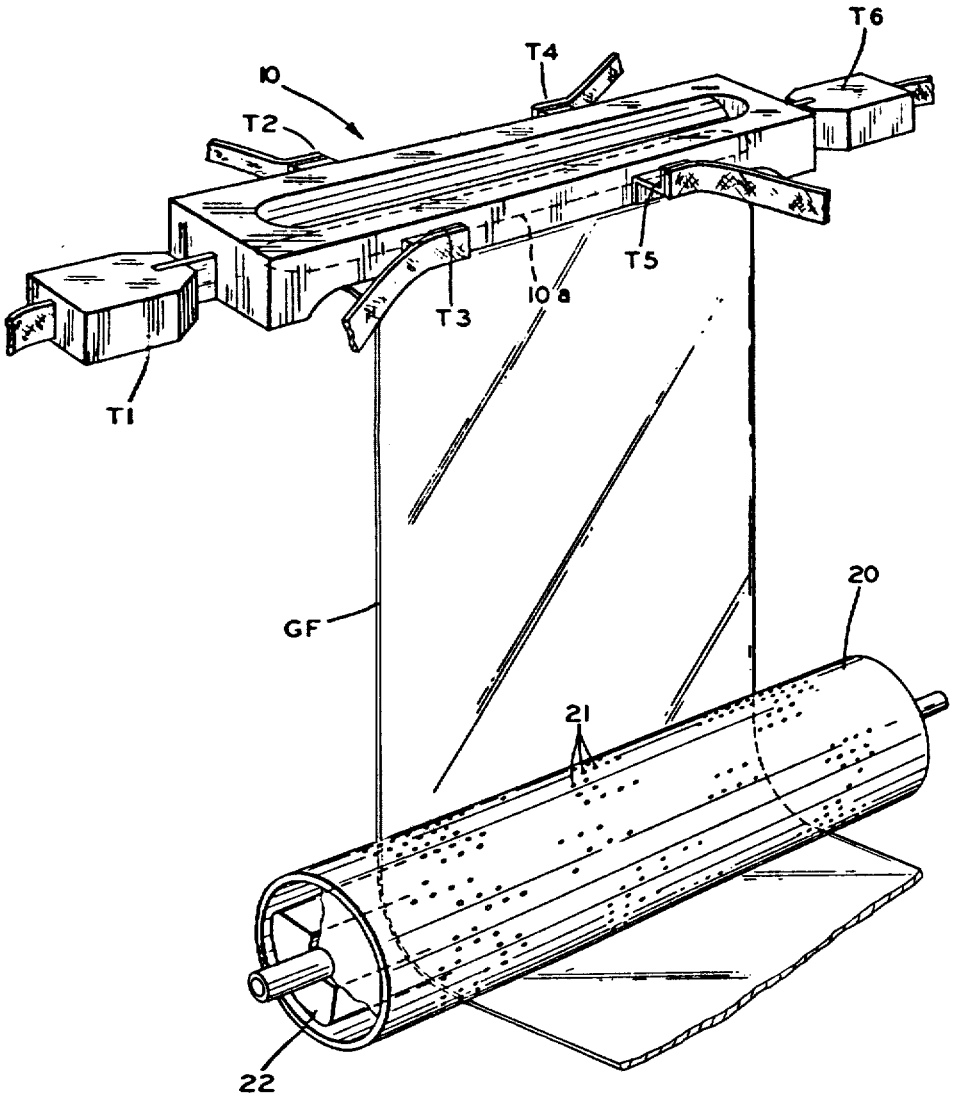
FIG. 1 is a schematic perspective view of a glass film drawing apparatus constructed in accordance with this invention.

Numeral 10 schematically indicates an elongated, slot-like orifice defining block which is adapted to be mounted within a molten pool of glass to permit a thin film of glass, of a thickness range of 0.0005 inches to not more than 0.003 inches to be drawn through the open bottom slot end 10a of the orifice by a rotating draw roll 20 positioned vertically below the slot-like orifice 10a. The draw roll 20 is of conventional construction and has a perforated cylindrical exterior surface 21 to which the glass film GF is caused to adhere over about 90° of the surface through the application of vacuum applied through a stationary suction box 22 conventionally mounted within the perforated draw roll 20. After the drawn film GF leaves the draw roll 20, it is directed to a suitable winding drum (not shown) to be wrapped into rolls for further distribution.

In the simplest form of this invention, the orifice defining block 10 may be fabricated in its entirety from a hot glass resistant, electrically conductive metal such as platinum or a molybdenum alloy. A minimum thickness of 0.030" would be required. A plurality of electrical terminal connections T1, T2, T3, T4, T5 and T6 are provided for separately connecting the central and lateral edge portions of the orifice defining block 10 to a low-voltage, high current source of electrical energy. The voltages applied to the respective terminals are such that substantially greater current flow, hence heating effect, is produced in the central portions of the orifice defining block 10, as by current flow between electrodes T2 and T4, and T3 and T5, respectively, than in the lateral end portions of the orifice block 10 as determined by current flow through electrodes T1 and T6.

*In the apparatus of the present invention, the slot-like orifice 10a has a width of 0.40 inches or less, and the width of such orifice is usually in a range from 0.10 to 0.40 inches.*

Figure 2:
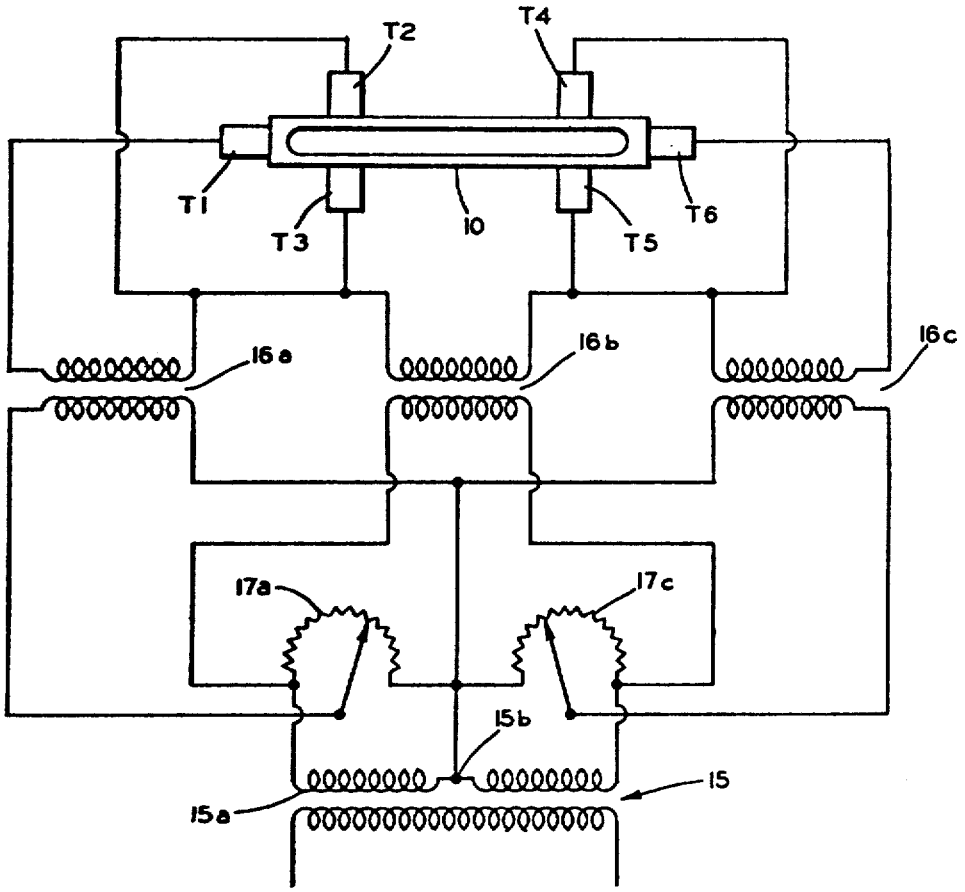
FIG. 2 is a schematic electrical circuit illustrating one manner in which differential heating currents are applied to the glass drawing orifice of FIG. 1.

Referring now to FIG. 2, one electrical circuit for conveniently effecting the differential application of heating current flow to the various portions of the orifice defining block 10 is illustrated. A conventional source of electrical power, such as 440 volt, sixty cycle AC source supplies a transformer 15 having a secondary winding 15a having a midpoint tap 15b providing two sources of reduced voltage, say 115 volt each, as well as a 230 volt source across the entire secondary winding 15a.

Three subsidiary transformers are provided, respectively 16a, 16b and 16c. The primary of transformer 16b is connected across the ends of the secondary winding 15a, and the output of transformer 16b has one side connected to elecrodes T2 and T3 and the other side to elecrodes T4 and T5. Secondary transformer 16a is suppied from one half the secondary winding 15a through a variable auto transformer 17a. The output of secondary transformer 16a has one side connected to electrodes T2 and T3 and the other side connected to the orifice block end electrode T1. Similarly, the third secondary transformer 16c is connected to the other half of the secondary winding 15a through a variable autotransformer 17c and the output winding of secondary transformer 16c has one side connected to electrode terminals T4 and T5 and the other side connected to the orifice block end electrode T6.

It is therefore apparent that the amounts of current flowing around the end portions of the orifice block 10 are represented by the currents flowing through end electrodes T1 and T6 respectively. Moreover, the amount of this current may be conveniently varied by adjusting the setting of the autotransformers 17a and 17c. Such adjustment is made to arrive at an orifice block temperature differential between the central portions, which are primarily heated by current supplied from secondary transformer 16b, so as to result in an approximately forty degree F. temperature differential between the lateral edges of the drawn glass film GF passing through the orifice block 10 and the central portions of such glass film.

With the described method and apparatus the glass film GF is essentially drawn at a speed where the volume of glass film made equals the glass volume issuing from the orifice 10a. The process remains continuous on this basis, and the relatively wide sheet of film, on the order of 12 to 24 inches, which is generally up to 90% of the length of the orifice 10a, remains wide by virtue of the closely controlled temperature of the lateral edges of the glass film. For a soda-lime glass, the preferred edge viscosity is about log 4.2 when the viscosity of the center portion of the glass film is about log 4. This amounts to about a 40° F. difference in temperature. With this temperature differential, the film edges resist the force of surface tension and a wide, but thin, film of glass can be formed. The film edge cross section is essentially the same dimensions as the balance of the glass ribbon cross section, tapering slightly thinner at the extreme ribbon edge. Thus the edges do not have to be trimmed prior to use.

In a typical situation, the desired orifice temperature differential is developed by utilizing an alternating current of about 2,500 amps applied with a two volt potential. This provides about five KVA of power in total applied to the orifice block 10. The provision of the two variable autotransformers 17a and 17c not only permits the maintenance of the desired temperature differential between the lateral edges and the center portions of the drawn glass film but can also be utilized to preferentially heat one or the other edge of the glass film more than the opposite end to compensate for any unbalanced heating or cooling conditions that may be encountered. Once established, the differential orifice temperatures, hence the differential glass film temperatures, remain at the desired condition indefinitely and an effective and reliable glass film production process is thus achieved.

While the apparatus has been schematically illustrated as comprising a solid orifice block, those skilled in the art recognize that a multi-piece refractory block structure may be employed wherein only the glass contacting surfaces of the orifice are defined by a thin sheet or coating of platinum or similar glass resistant electrically conducting material. For example, the adjustable orifice construction described in Stein U.S. Pat. No. 3,473,911 may be advantageously employed. The orifice defining surfaces of the adjustable orifice disclosed in the Stein patent may be provided with either a coating or an abutting thin plate of platinum or similar glass resistant electrically conducting metal. The metallic coating should have a minimum thickness on the order of 0.020" to provide sufficient metal to conduct the heating current. Separate electrical connections would be provided to permit the controlled flow of electrical current through each of the center portions and the two lateral end portions of the metal defining the glass emitting orifice.

Other modification of this invention will be readily apparent to those skilled in the art and it is intended that the scope of the invention be determined solely by the appended claims.

I claim:

1. An apparatus for drawing glass film of a thickness less than 0.003 inch, comprising a block of hot glass-resistant material, means mounting said block in underlying relationship to a pool of molten glass, said block defining an elongated slot like orifice having a width in the range of 0.10 inch to 0.40 inch through which a film of glass may be continuously drawn, the walls of said orifice being electrically conductive, a plurality of electrical junctions connected to spaced areas of said walls, and power means for flowing electric current through said junctions and said orifice walls to maintain the lateral end portions of said orifice walls at a lower temperature than the central portions, thereby maintaining both edge areas of the drawn film at a lower temperature than the center area.

2. The apparatus of claim 1 wherein the temperature differential of the drawn film is on the order of 40° F.

3. An apparatus for drawing glass film of a thickness less than 0.003 inch, comprising a refractory structure adapted for mounting beneath a pool of molten glass, said structure defining a pair of opposed surfaces definng a bottom opening slot, a glass resistant metal coating on said surfaces defining an orifice having a width of less than 0.40 inch through which a film of molten glass may be continuously drawn, an electrical power source, and means for separately flowing electric currents through the central portions of said metal coatings and the lateral end portions of said metal coatings from said power source, thereby maintaining the said lateral end portions of said coatings at a lower temperature than said central portions.

4. Apparatus of claim 3 plus means for adjusting said electric currents to maintain a temperature differential between the edges and central portion of the drawn film on the order of 40° F.

5. A method of controlling the temperature of a thin film of glass drawn from a slot-like metallic walled orifice, the orifice having a width of exceeding 0.40 inches, comprising the steps of passing separate electrical currents through the central portions of the orifice walls and through each of the lateral end portions of the orifice walls, and controlling said electrical currents to produce a temperature differential of the cental portions of the orifice walls in excess of the temperature of the lateral end walls of the orifice, and drawing a film of glass of a final thickness not in excess of 0.003 inches through said orifice.

6. The method defined in claim 5 wherein the temperature differential of the orifice walls is controlled to produce a differential on the order of 40° F. between the temperature of the central portions of the drawn glass film and the lateral edge portions of the drawn glass film.

* * * * *

UNITED STATES PATENT AND TRADEMARK OFFICE

CERTIFICATE OF CORRECTION

PATENT NO. : Re. 31,442

DATED : November 15, 1983

INVENTOR(S) : Lawrence V. Pfaender

It is certified that error appears in the above–identified patent and that said Letters Patent are hereby corrected as shown below:

Col. 4, Claim 5, line 48, "of" should be --not--.

Col. 4, Claim 5, line 53, "cental" should be --central--.

Signed and Sealed this

*Twenty-eighth* Day of *February 1984*

[SEAL]

*Attest:*

GERALD J. MOSSINGHOFF

*Attesting Officer*

*Commissioner of Patents and Trademarks*